(12) United States Patent
Wexler

(10) Patent No.: US 9,807,181 B2
(45) Date of Patent: Oct. 31, 2017

(54) DETERMINATION OF GENERAL AND TOPICAL NEWS AND GEOGRAPHICAL SCOPE OF NEWS CONTENT

(71) Applicant: Yahoo Holdings, Inc., Sunnyvale, CA (US)

(72) Inventor: Mike Wexler, Santa Clara, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 317 days.

(21) Appl. No.: 13/944,409

(22) Filed: Jul. 17, 2013

(65) Prior Publication Data
US 2015/0026255 A1   Jan. 22, 2015

(51) Int. Cl.
| | |
|---|---|
| *G06F 15/16* | (2006.01) |
| *H04L 29/08* | (2006.01) |
| *H04L 12/58* | (2006.01) |
| *G06F 17/27* | (2006.01) |
| *G06F 17/30* | (2006.01) |
| *H04W 4/18* | (2009.01) |

(52) U.S. Cl.
CPC ............ *H04L 67/22* (2013.01); *G06F 17/27* (2013.01); *G06F 17/3087* (2013.01); *H04L 51/20* (2013.01); *H04W 4/185* (2013.01); *H04L 51/32* (2013.01)

(58) Field of Classification Search
CPC .... G06Q 50/01; G06Q 30/0631; G06Q 30/02; G06Q 30/0201; G06Q 30/0282; G06F 17/30864; G06F 17/30598; G06F 17/30705; G06F 17/30867; G06F 17/3053; G06N 5/048; G06N 5/003; H04L 67/22; H04L 51/20; H04L 51/32; H04W 4/185
USPC .................. 709/204, 224, 205; 707/723, 738
See application file for complete search history.

(56) References Cited

U.S. PATENT DOCUMENTS

| | | | |
|---|---|---|---|
| 6,067,539 A * | 5/2000 | Cohen | |
| 8,370,348 B1 * | 2/2013 | Reilly | G06Q 30/02 707/731 |
| 8,700,610 B1 * | 4/2014 | Kataru | G06F 17/30699 707/722 |
| 2005/0060312 A1 * | 3/2005 | Curtiss | G06F 17/30864 |
| 2005/0108383 A1 * | 5/2005 | DeHaas et al. | 709/224 |
| 2008/0077569 A1 * | 3/2008 | Lee et al. | 707/5 |
| 2010/0262599 A1 * | 10/2010 | Nitz | G06F 17/3087 707/723 |

(Continued)

*Primary Examiner* — Dhairya A Patel
(74) *Attorney, Agent, or Firm* — Martine Penilla Group, LLP

(57) ABSTRACT

Methods for categorizing news are presented. One method groups articles into clusters that share a common topic. A first category is identified for each article that indicates if the article is news or not. Further, the method includes an operation for determining use data for each article that has information about people that have accessed or referenced the article. Additionally, the method includes an operation for combining the use data and the first category for all the articles in each cluster to determine the geographical scope of interest for the cluster. The use data and the first category are combined for all the articles in each cluster to determine a second category for each article that indicates if the article is general news, topical news, or not news. The articles are presented to the user based on the geographical scope of interest, the second category, and the attributes of the user.

20 Claims, 8 Drawing Sheets

(56) References Cited

U.S. PATENT DOCUMENTS

| | | | |
|---|---|---|---|
| 2011/0173264 A1* | 7/2011 | Kelly | 709/205 |
| 2011/0294525 A1* | 12/2011 | Jonsson | 455/466 |
| 2012/0101965 A1* | 4/2012 | Hennig | G06N 7/005 706/12 |
| 2012/0303623 A1* | 11/2012 | Punera et al. | 707/738 |
| 2013/0212059 A1* | 8/2013 | Ameri-Yahia | G06F 17/30713 706/52 |
| 2015/0127748 A1* | 5/2015 | Buryak | G06F 17/30867 709/206 |

* cited by examiner

DETERMINATION OF GENERAL AND TOPICAL NEWS AND GEOGRAPHICAL SCOPE OF NEWS CONTENT

BACKGROUND

1. Field of the Invention

The present embodiments relate to methods for personalizing news, and more particularly, methods, systems, and computer programs for categorizing news articles and determining the scope of geographical interest for the news articles.

2. Description of the Related Art

The Internet has witnessed an explosive growth of online news. According to a recent report, more than 123 million people visited news websites such as Yahoo!™ News in May 2010, representing 57 percent of the total U.S. internet audience, with each visitor reading 43 pages on average. These numbers have been steadily increasing over the past years and show the growing appeal of reading news online.

Recommending interesting news articles to users has become extremely important for internet providers looking to maintain users' interest. While existing Web services, such as Yahoo!, attract users' initial clicks, ways to engage users after their initial visit are largely under explored.

Personalized news deliver a news stream to a user, according to the desires and use trends of the user. However, customizing the news stream is a complex problem because the number of news sources continues growing rapidly. In one estimate, there are between 600,000 and 2,000,000 different news categories or topics for filtering news. This wide variety of topics makes it hard to filter news for users.

Tens of millions of news items are created each day. Automatic categorization of news articles is critical to be able to deliver a personalized news stream.

There are some existing classifiers that analyze the content of a news article in order to determine the topic of the article. However, content analysis is sometimes incomplete. For example, if a news article contains a football game score, the news article may be categorized as in the topic of "Sports." However, if the football game is the Super Bowl, the news article may be categorized as "General News." For example, an article titled "The Raiders beat the Niners by three points" is likely sports. However, an article titled "The Raiders won the Super Bowl" could be General News (and/or Sports).

Most times, it is virtually impossible to determine the region of interest in the world for a news article just by looking at the content of the article. For example, a kidnapping may be news of interest for a county or a state where the kidnapping took place. But in some cases, the kidnapping may have national or worldwide appeal.

In some solutions today, determining the topic and the geographic scope of news articles is performed by editors that analyze each of the articles from a corpus of news documents. This process is expensive and cumbersome, and may also be limited by the editors' familiarity with the news topics.

It is in this context that embodiments arise.

SUMMARY

Methods, devices, systems, and computer programs are presented for categorizing news articles undetermined the geographical scope for the news articles. It should be appreciated that the present embodiments can be implemented in numerous ways, such as a method, an apparatus, a system, a device, or a computer program on a computer readable medium. Several embodiments are described below.

In one embodiment, a method for categorizing news articles is provided. The method includes an operation for grouping articles into clusters, each cluster being associated with a topic that is common to articles in the cluster. Further, the method includes an operation for identifying a first category for each article. The first category indicates if the article is news or not-news. In addition, the method includes an operation for determining use data for each article. The use data includes information about people that have accessed or referenced the each article. The use data and the first category for all the articles are combined in each cluster to determine the geographical scope of interest for the cluster. In addition, the method includes an operation for combining the use data and the first category for all the articles in each cluster to determine a second category for each article. The second category indicates if the article is general news, topical news, or not-news. The articles are presented to a user based on the geographical scope of interest, the second category, and the attributes of the user. In one embodiment, the operations of the method are executed by a processor.

In another embodiment, a computer program, embedded in a non-transitory computer-readable storage medium, for categorizing news articles includes program instructions for grouping articles into clusters, each cluster being associated with a topic that is common to the articles in the cluster. Further, the computer program includes program instructions for identifying a first category for each article, the first category indicating if the article is news or not-news. The computer program further includes program instructions for determining use data for each article, the use data including information about people that have accessed or referenced each article. Further yet, the computer program includes program instructions for combining the use data and the first category for all the articles in each cluster to determine a geographical scope of interest for the cluster. Additional program instructions are provided for combining the use data and the first category for all the articles in each cluster to determine a second category for each article, the second category indicating if the article is general news, topical news, or not-news. The computer program further includes program instructions for presenting the articles to a user based on the geographical scope of interest, the second category, and the attributes of the user.

In yet another embodiment, a system, for categorizing news articles, includes a processor and a memory. The memory has a computer program, where program instructions from the computer program when executed by the processor cause the processor to group articles into clusters, each cluster being associated with a topic that is common to articles in the cluster. In addition, the processor identifies a first category for each article, the first category indicating if the article is news or not-news. Further yet, the processor determines use data for each article, the use data including information about people that have accessed or referenced the each article. The processor further combines the use data and the first category for all the articles in each cluster to determine a geographical scope of interest for the cluster. In addition, the processor combines the use data and the first category for all the articles in each cluster to determine a second category for each article, the second category indicating if the article is general news, topical news, or not-news. The articles are presented to the user based on the geographical scope of interest, the second category, and the attributes of the user.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, systems, and computer programs for categorizing news articles. It will be apparent, that the present embodiments may be practiced without some or all of these specific details. In other instances, well known process operations have not been described in detail in order not to unnecessarily obscure the present embodiments.

Figure 1:
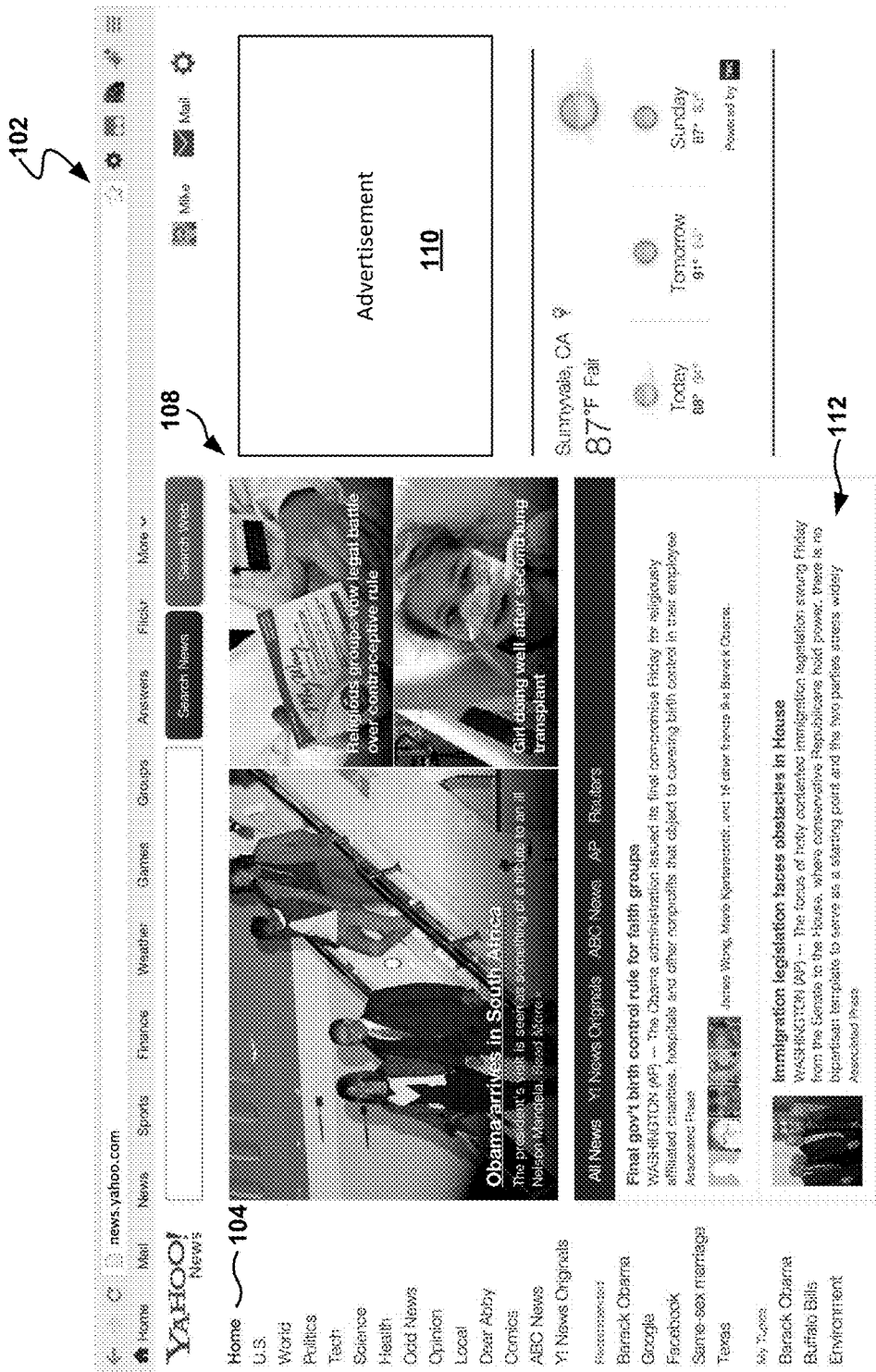
FIG. 1 shows a home page provided by an Internet news service, according to one embodiment.

FIG. 1 shows a home page provided by an Internet news service, according to one embodiment. In one embodiment, the online news page 102 includes a plurality of links 104, also referred to as tabs, each link being provided for the selection of a news topic. Examples of news topics include News, Sports, International, Finance, Food, Lifestyle, Technology, Travel, Shopping, Entertainment, etc. When the user selects one of the tabs, the news page displays the news articles related to the selected tab, except for the Home tab where the user is taken back to the news homepage.

There is not an accepted exact definition of what are the conditions for an article to belong in a certain topic category. In general, the topic for a news article can be considered as the mayor area or section of a newspaper where an editor would place the article. Maybe not all editors would agree on certain news articles, but generally, editors would agree at least in 90% of the cases that a news article belongs in a certain section.

Typically, the front section of the newspaper is the General News section. In general, it is easier to define when a news article belongs in other topic sections, such as Sports or Finance. In some sense, articles for the General News sections are articles that cannot be classified as anything else, such as Sports, Living, Entertainment, Finance, etc. According to one definition, a news article belongs in the General News section when the news article relates to a recent story regarding recent events, where the news article does not fit better in other sections of the newspaper, unless the news article relates a story that makes the news article specially important and more relevant for placement in the General News section than in other sections. Of course, there can be multiple exceptions to this definition, but the goal of the automated categorization of news is to simulate the work of human editors when news articles are categorized.

The online news page 102 may also include an area for personalized news or featured news 108, an advertisement area 110, a general area news stream 112, etc.

Embodiments presented herein automatically categorize a corpus of articles, slideshows, videos, etc., to identify the category for the news articles and the geographic scope of interest for the news articles. The geographic scope of interest for the news article is the geographic area in the world where the users within the geographic area would be generally interested in the news article. The geographic scope is also referred to herein as the region of interest, scope of interest, or audience for the article.

Of course, there may be other factors defining whether a user is interested in an article or not. The geographic scope defines areas where an average or general user would be interested in the topic associated with the article.

Sometimes, the articles include metadata that identifies the topic of the article and the scope. For example, news articles originated by a news agency may have metadata specifying the topic area or areas, scope of interest (e.g., regional, state or states, national, continental, worldwide), etc. The metadata may be used to categorize news articles, but the metadata is not completely determinative of the ultimate classification for the article. The metadata is just one of the factors used for categorizing and scoping the news articles. More details about sample metadata available for a news article are provided below with reference to Table 1.

Some of the metadata may be used for categorization purposes. For example, the value for DistributionScope in the example of Table 1 is "National," which indicates that the article is appropriate for a national audience. Additionally, other metadata that may be used for categorization includes metadata with the values of "AP Top News," "AP Top News—International—Stories," "AP Top News—Political—Stories," "AP Top News—General—Stories," "AP Top News Package," etc.

For many news articles, there is a wide distribution of publishers that publish those articles. Often, the publishers provide the same level of metadata in their articles, although some publishers may include more or less metadata. By extracting the metadata from the AP article, it is possible to infer the categorization of the other articles in the cluster.

In some cases, the metadata is found in the URL. For example, a website having a URL of www.siteexample.com/uk-world-news/president-visits-italy indicates that the article is of worldwide interest given the text string "world-news" in the URL. Further, it is noted that the clusters may also include other non-traditional news sources such as blogs or twitter.

Embodiments presented herein perform an automated (rather than editorial) classification of news on a large scale, using a plurality of signals. Each signal is an item of information that helps categorize the news article. As used herein, unless otherwise noted, categorizing a news article requires defining whether the article is news or not news, and if the article is news determining if the article is general news or topical news. In addition, categorizing includes determining the geographic scope of interest for the news article.

The categorization of the news article is used, in one embodiment, to generate personalized news streams for users. Embodiments presented herein are described with reference to news article that include text, but the principles presented herein may also be utilized with other types of news items, such as slideshows, video news, images, etc. In one embodiment, tags associated with the aforementioned items may be used for categorizing the respective items. Another embodiment may use automated transcripts from audio or video content. In yet another embodiment, closed captions are used for categorizing.

It is noted that the embodiment illustrated in FIG. 1 is exemplary. Other embodiments may utilize different webpage layouts, additional or fewer sections, present the sections in different order, utilize different news topics, etc. The embodiments illustrated in FIG. 1 should therefore not be interpreted to be exclusive or limiting, but rather exemplary or illustrative.

Figure 2:
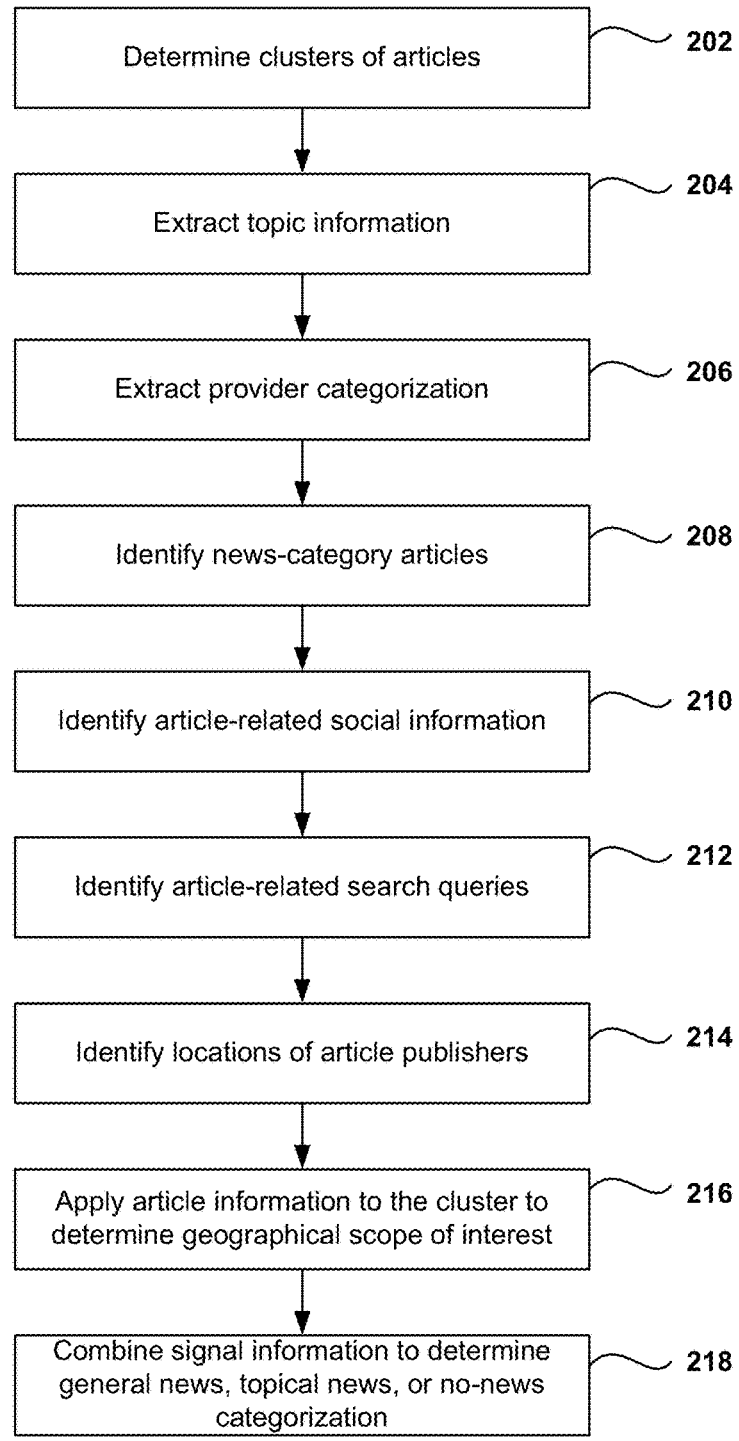
FIG. 2 is a flowchart illustrating an algorithm for categorizing news articles in accordance with one embodiment.

FIG. 2 is a flowchart illustrating an algorithm for categorizing news articles in accordance with one embodiment. While the various operations in this flowchart are presented and described sequentially, one of ordinary skill will appreciate that some or all of the operations may be executed in a different order, be combined or omitted, or be executed in parallel.

The flowchart of FIG. 2 shows the operations performed for each news article, in order to categorize the news article (e.g., determine the topic of the article, determine whether the article belongs to the General News section, to the topical News section, or is not news) and determine the geographic scope for the article. It is noted that, as used herein and unless otherwise noted, an article is defined as News or not-News depending on whether the article is considered news or not. Articles that are considered News are classified as general-news articles when they belong in the General News section, and topical articles, also referred to as topical news, when they belong in one of the topical News section. In a general sense, an article may be for a topical news section (e.g., for the sports sections) but not for the General News section. Therefore, an article that belongs in the General News section is referred to herein as a General-News article, and an article that does not belong in the General-News section is referred to as a not-general-news article or topical-news article.

In operation 202 the articles are grouped into clusters. In one embodiment, a cluster includes all the articles that relate to the same event. In one example, the following articles are available:

1. Bomb at marathon,
2. Women held captive in Cleveland,
3. Explosion in Boston, and
4. Sex slaves in captivity.

Some of these articles may relate to the same event, although the articles may have different titles. In the above examples, articles 1 and 3 relate to the same event or story, therefore, article 1 and 3 should be grouped into the same cluster. Further, articles 2 and 4 are related to the same event, different from the story of articles 1 and 3. Therefore, articles 2 and 4 fall into the same cluster, which is a different cluster from the cluster of articles 1 and 3.

Further, it is noted that articles may have a different degree of "similarity," which measures how similar two articles are. In order to identify if articles are in the same cluster, in one embodiment, the commonality among the articles is examined, and if the articles share a high degree of commonality, then the articles relate to the same topic and belong in the same cluster.

In order to group articles into clusters, well-known methods for creating clusters, such as hierarchical clustering and mixture of Gaussians, are utilized. In one embodiment, if a news article is determined to be News, then the other articles in the cluster will also be considered to be News. Further, it one article in the cluster is determined to have a certain geographical scope (e.g., worldwide), then the other articles in the cluster will also be likely to have the same geographical scope (at least with a certain degree of confidence, e.g., 90%). Further yet, if one article in the cluster is considered to be general news, then the other articles in the cluster will also be considered general news, and if one article in the cluster is considered to be topical news then the other articles in the cluster will also be considered to be within the same.

For example, if one of the articles in the cluster has been originated by a news source (e.g., Reuters), the article may have metadata that indicates that the article is appropriate for a national audience. Then other articles in the cluster, even though the articles may not have metadata indicating their scope, are also assumed to be for a national audience.

After determining the clusters in operation 202, the method flows to operation 204 where topic information is extracted. In one embodiment, a tool is used that automatically identifies the category of the article by analyzing the text within the article. The category may be identified as News, Sports, Finance, etc. In addition, the tool may further identified sub categories within a given category. For example, within Sports the tool may identify which sport is associated with the article, such as baseball, football, tennis, golf, etc.

From operation 204 the method flows to operation 206 where the categorization available from news provider is extracted. The data (e.g., news article metadata) available from news sources is used to identify the news category identified for each of the articles.

It is noted that metadata may not available for all news articles. For example, news items originated in Twitter will likely lack metadata, while articles from Reuters will likely have metadata.

At this point, the information regarding clusters, categorization from the topic tool, and metadata from news sources is combined. The result is an identification of the subject of the cluster. For example, in the example cited above one cluster will identify that the cluster is about a bomb in a marathon in Boston. Further, an initial determination of the news category is identified for the cluster.

From operation 206, the method flows to operation 208 in order to determine if the article is News or not-News. In this operation, an automated categorization is performed utilizing machine learning algorithms. More details are provided below with reference to FIGS. 3 and 4.

From operation 208, the method flows to operation 210 where social information associated with each of the articles is identified in order to search for a geographical area where the article is being actively referenced within one or more social networks, or some other websites. More details are provided below regarding operation 208 with reference to FIG. 5.

From operation 210 the method flows to operation 212 to identify article-related search queries. The system determines which users have performed search queries for the subject associated with a cluster. The geographic data, if available, associated with the users that perform the searches is analyzed to determine the geographical interest for the articles in the cluster. For example, when a user is logged in to a search engine, or to some of the services (e.g., email) provided by the search engine service provider, then the information available about the user's location is used for determining where the search is being performed. Information about a user's location may be determined by looking up their computer's IP address in IP to Geo databases, using HTML5 Geolocation (especially in mobile devices), by their explicit settings, etc.

In some cases, there may be geographic information for a user that is different from the actual location of the user. For example, a user from England is living in the United States, and the user information identifies that the user was born in England. Although the user may be in the United States, the information is still valuable because the user may be interested in news of interest in England, although the user may be living abroad.

The search engine may be a general Internet search engine, such as Yahoo! However, the search engine may be a search engine specialized in a certain subject. This specialized type of search engine is referred to herein as a vertical search engine. Examples of vertical search engines include news websites, shopping websites, financial news websites, sports websites, travel websites, etc.

In one embodiment, the frequency of searches performed on vertical search engines, and the frequency of searches performed on general search engines are utilized to determine the intent of a user. For example, a search performed on a sports website will give an indication that the news article is related to Sports. This is one of the signals used to determine the final assignment of the cluster to a particular category, as described in more detail below.

From operation 212, the method flows to operation 214 where the geographical location of article publishers is identified. For example, a blogger may generate an item that is associated with a cluster. The location of the blogger may be used as a signal for the geographic interest in the cluster. Further, if the article is published by a newspaper, the location (e.g., city) of the newspaper is used as a signal to identify interest in the article.

In one embodiment, a list is made for the locations of all the publishers of articles in the cluster, together with a count or frequency of use within each of the locations. This information may be used as a signal to determine the geographic scope of the articles in the cluster.

From operation 214, the method flows to operation 216 where all the information for all the articles in the cluster is analyzed in order to determine the geographical scope of interest for the cluster. More details are provided below with reference to FIG. 6 on how the information from the different sources is utilized to determine the geographic audience.

From operation 216, the method flows to operation 218 where all the information (e.g., signals) available for all the articles in the cluster is utilized to determine if the articles in the cluster are general News, topical News, or not-News. More details are provided below with reference to FIG. 6.

Figure 3:
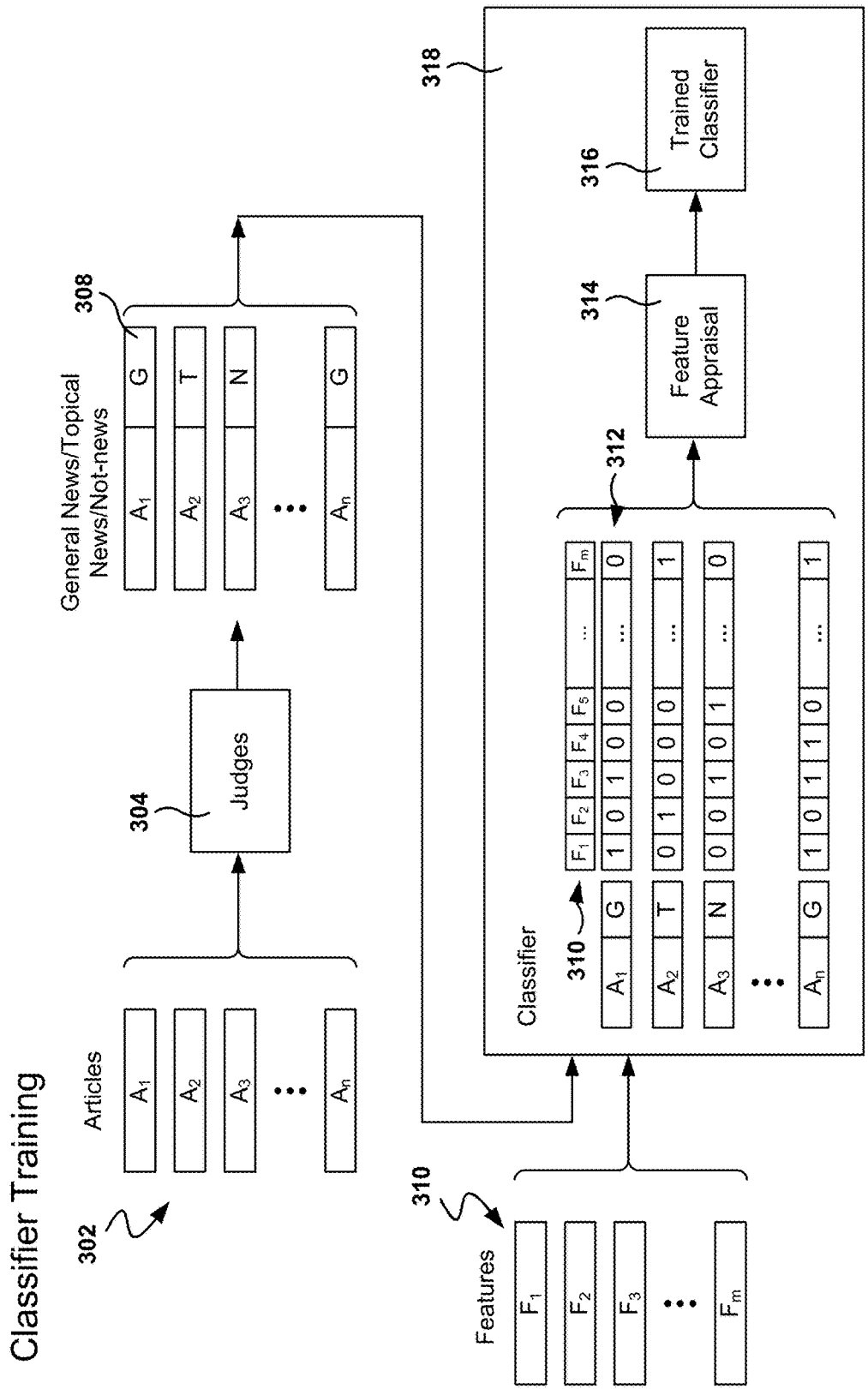
FIG. 3 illustrates a method for training the classifier, according to one embodiment.

FIG. 3 illustrates a method for training a classifier, according to one embodiment. The classifier is a computer program that determines the probability that an article is General News, Topical News, or not-News. The classifier utilizes machine learning and relevance models to determine the categorization of the article. In one embodiment, the classifier is a logistic regression classifier, but other type of classifiers may also be used.

A plurality of articles 302 $A_1$-$A_n$ are provided to human judges 304. For each article, a judge determines if the article is General News (G), Topical News (T), or not-News (N). In one embodiment, each article is given a value 308 (G/T/N) indicating if the article is General News, Topical News, or not-News. In one embodiment, the same articles are given to a plurality of judges and a compound score is obtained for each article based on the scores given by each of the judges.

In one embodiment, a plurality of features 310 $F_1$-$F_m$ are defined and input into classifier 318. Each feature, when found in an article, increases the probability that the article is within the G, T, or N categories. Each feature may have a different impact on the calculation of the probability, and during the training phase the classifier determines the relative importance for each of the features.

For example, one of the features may be defined as a date in the article. Another feature may be that a date towards the beginning of the article is within the last 48 hours. For example, a recent day in the article is a good indicator that the article is News (e.g., G or T). Other features may be selected from the following group:

The article contains a date or a date reference (e.g., a date—Nov. 7, 2011, or January 2011; relative date—last month, Yesterday; name of a month—February; a year—2007; a day of the week—Monday; etc.)

The article contains a time related word or a word for measuring time (e.g., ago, days, weeks, months, years, etc.)

The article has capitalized words in the middle of the sentence (e.g., President Obama, John Lennon, Congress)

The article includes sentences in the past tense (e.g., the victim was last seen when leaving the supermarket)

One or more verbs refer to an action (e.g., drove, died)

The article contains a proper name (e.g. Michael, The Beatles)

The article contains the name of a celebrity (e.g., Lady Gaga, Elton John, Michael Jordan)

The article contains the name of a media outlet (e.g., NBC, CNN, NY Times, Reuters, etc.)

The article contains words indicative of telling a story (e.g., reported, according to, said, announced, indicated, explained, etc.)

The article contains words often found in news reports (e.g., accident, car crash, police, lawyer, divorce, press conference, announcement, dollars, stock market, recession, etc.)

The article contains the name of a crime or a word related to a crime (e.g., kill, kidnap, assault, robbery, lawyer, bounty, dead, death, injured, hospital, charged, arrested, drunk, etc.)

The article contains a title (e.g., President, CEO, Coach, Principal, Doctor, etc.)

etc.

The list of features recited above is exemplary, and other embodiments may utilize different features, or a subset of these features. The feature list should therefore not be interpreted to be exclusive or limiting, but rather exemplary or illustrative.

The features 310, the articles 302, and the article scores 308 are input to the classifier 318. For each article, the classifier determines if each of the features is present in the article 312 (which is represented in FIG. 3 as a logical value of 1 when a feature is present, and a value of 0 when the feature is missing).

In the feature appraisal phase 314, the classifier utilizes machine learning algorithms to compare the presence of each of the features in the article with the scores of the article, as discussed in more detail below with reference to FIG. 4. The result of the feature appraisal 314 is a trained classifier 316, which includes an assessment of the value of each of the features $F_1$-$F_m$ for predicting if an article is General News, Topical News, or not-News. In addition, the trained classifier evaluates the importance of finding a combination of features in an article.

Figure 4:
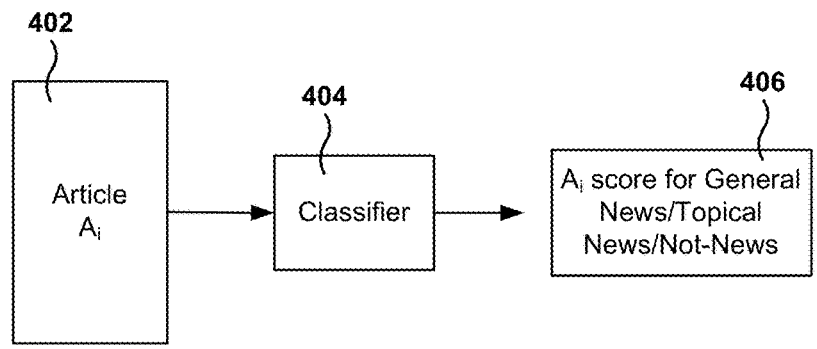
FIG. 4 illustrates the use of the classifier for categorizing news articles, according to one embodiment.

FIG. 4 illustrates the use of the classifier for categorizing news articles, according to one embodiment. After the classifier has been trained, as discussed above with reference to FIG. 3, the classifier 404 is utilized to determine if the article 402 is General News, Topical News, or not-News. The determination includes a score 406 on the confidence that the article 402 in each of the categories. For example, the score might be a 90% probability that the article is General News, but other types of scores may also be utilized.

At this point, the method has assessed whether the article is General News, Topical News, or not-News. However, the geographic scope of the article is still to be determined.

Figure 5:
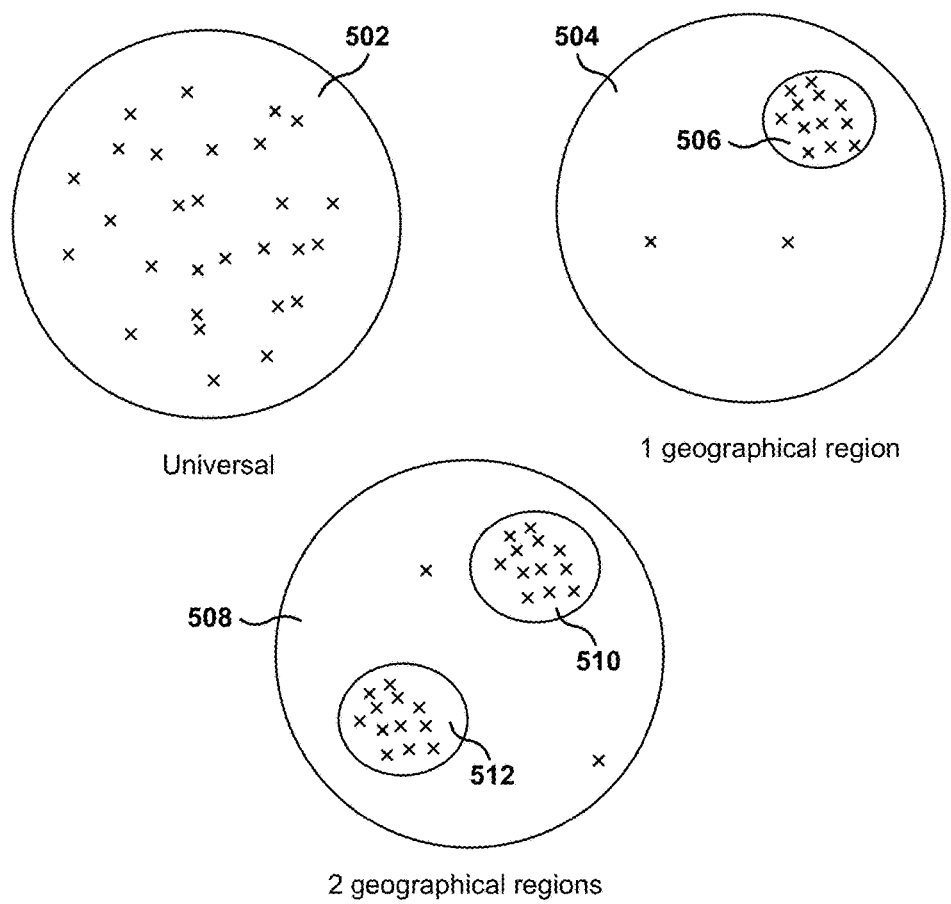
FIG. 5 illustrates the definition of regions of interest for a news cluster, according to one embodiment.

FIG. 5 illustrates the definition of regions of interest for a news cluster, according to one embodiment. In general, the content of a news article does not inherently identify the geographic scope of the article. For example, some local news may go viral and become interesting for a worldwide audience.

In one embodiment, after identifying the general category for the articles in the cluster, information from social networks is gathered in order to obtain geographic scope for the articles. In one embodiment, the information from a social network about the users that have endorsed (e.g., liked or given a thumbs-up) an article in the social network is collected and analyzed to determine the location of the users. This information is used to determine the audience for the article, as the audience for the article is likely to make references to the article in the social network.

In another example, the method examines the twitts from users in Twitter™ and the location of the users that twitted about a given cluster is used to determine the region of interest.

In other embodiments, other user network activities are monitored to identify the scope. For example, the activities of users when sending emails, or text messages, or using a messaging service, or blogging, etc., are monitored to identify where the cluster is being referenced within one or more forms of network activities. In general, any communication activity that is related to a news article may be analyzed to determine the geographic scope of interest, based on the users involved in the communication activity. The location information from both the originator of the communication and the receiver of the communication may be used to identify geographic scope.

For example, in the case of emails, an email service may process hundreds of millions of emails a day. People often find interesting articles and send the articles, or links to the articles, to other users. If the email service is aware of the geographical location of the sender and/or the receiver, these geographic locations of sender and receiver provide additional information to determine locality for the articles in the cluster.

In one embodiment, a list of locations is created and then the frequency of use within network communications is tallied for each of the clusters. Depending on the frequency of use for different locations, the articles are then marked as neighborhood, city, regional, state, national, international, etc., based on the relative frequency of use of the articles.

FIG. 5 illustrates graphically the determination of the region of interest for articles. For example, sometimes the locations and frequencies may be distributed all over the world 502, which defines that the article as having universal scope.

In another embodiment 504, the references are clamped or grouped within a geographic area 506. In this case, the scope of the article will be for users within geographic area 506.

Further yet, as in case 508, there may be more than one zone of interest for a given article (e.g., zones 510 and 512). For example, a news article about the score of a game between the teams of two different cities will likely produce two different localities, one for each city.

It is noted that the embodiments illustrated in FIG. 5 are exemplary. Other embodiments may utilize different rules for identifying regions, identify a different number of regions, etc. The embodiments illustrated in FIG. 5 should therefore not be interpreted to be exclusive or limiting, but rather exemplary or illustrative.

Figure 6:
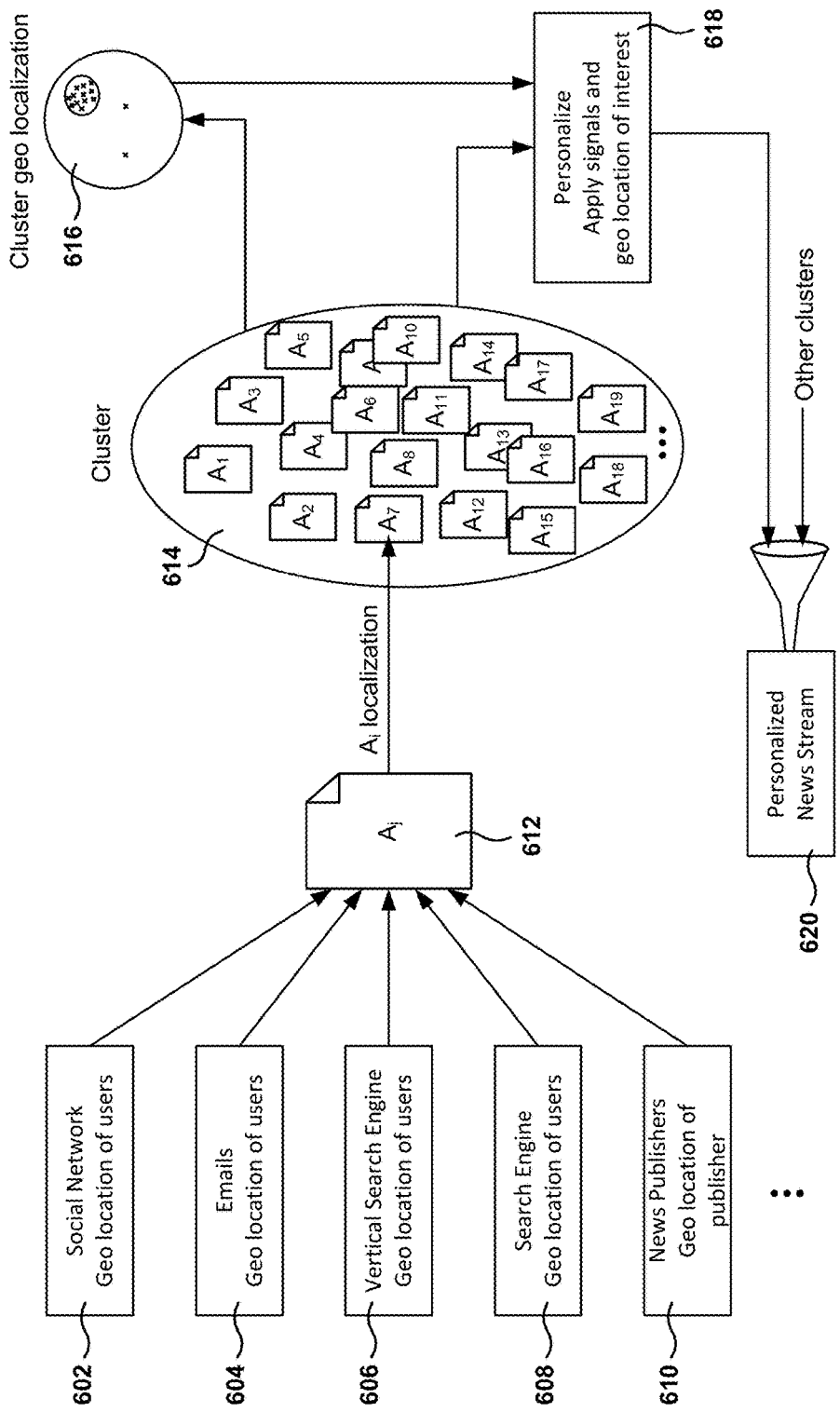
FIG. 6 illustrates the process for creating a personalized news stream, according to one embodiment.

FIG. 6 illustrates the process for creating a personalized news stream, according to one embodiment. A plurality of signals is used to categorize articles and determining the geographic scope of interest. FIG. 6 includes a plurality of signals 602, 604, 606, 608, 610, etc., but other signals may be added to include additional information useful for helping to categorize and localize articles.

For example, the geographical information 602 obtained from social network activity is used as one of the signals. Additionally, different indicators for determining that a user is interested in an article maybe used. For example, when a user of the social network, or some other website, "likes" an article, or recommends the article, etc. In one embodiment, an affinity from the user towards an article may be measured by the amount of time that the user spends reading the article. In another embodiment, the amount of time the user spends in a webpage before clicking on an article may also be used as a sign to denote interest. In yet another embodiment, how far the user has to go down a stream of articles presented on a webpage is another signal showing interest on the article.

Social data may be important to determine the importance of a news article. For example, there could be a blog submitted by an unknown writer, but the unknown writer may be the direct witness of a news event, such as a police shootout that happened in front of the witness bedroom. Information about the publisher in this case would make the blog seem unimportant, but users may detect quickly the importance of this blog as a first-hand narration of the event. In this case, the unknown user may be the best source for news.

Another signal is the geographic locations 604 of email senders and receivers, as previously discussed with reference to FIG. 2. The geographic locations 606 of users utilizing vertical search engines may also be used as signals.

Further yet, another signal is the geographic locations 608 of users using general search engines. In one embodiment, the IP address of the searcher is utilized to obtain a geographic location. In other embodiments, GPS information available in the device used to perform the search (e.g., a smart phone) is used to obtain the geographic location. With regard to search engines, a first signal is used when a user performs a search related to a news item. In another embodiment, a second signal is used when the user clicks on the news article after performing the search.

As discussed above, the geographic location 610 of the news publishers may be used as another signal for categorizing and localizing news. For example, if a San Francisco newspaper reports a story, it is probable that the story will be of interest in, at least, the area around San Francisco. Further, when and article is published all over the world, then it is probable that the article is for a worldwide audience. However, if the article is published in just one location, then it is more probable that the article will be of interest to the people nearby the location of the publisher.

In one embodiment, the signals obtained for all the individual articles in the cluster 614 are combined to determine geographic scope 616, and to create a personalized 618 news streams for users.

In one embodiment, there is a percentage of relatedness between the items in a cluster, which may be based on common words in the article, or in some other factors. The probabilities of sameness between two articles within the cluster are used to determine localization. For example, if article $A_1$ has a 90% probability that is of interest to the people in Boston, and article $A_2$ is 70% related to article $A_1$, then it can be inferred that $A_2$ has a 63% probability of being of interest to the people in Boston.

One of the advantages of clustering is that there might be a large amount of information about an article that is relatively old (i.e., the article is not News anymore because it is too old). However if a new article in the same cluster is published, the information previously available may be useful to determine the localization of the new article. This way, trends may be detected right away, instead of having to wait for the trends to manifest themselves by examining the actual social use of the news article.

In one embodiment, the signal information obtained for all the articles is combined to determine if an article is News or not-News. In one embodiment, the signal information is linearly combined utilizing predetermined weights, which might be adjusted over time. However, other types of equations maybe used for combining signal information.

For description purposes, four different signals, a, b, c, and d, contain information about an article. Examples of signals may be the output from the machine learning classifier, likes from users, vertical searches, emails about the article, date of creation, etc. In one embodiment, the score S for determining if an article is News is calculated according to the following formula:

$$S_1 = \Sigma_{i=1 \text{ to } n} m_i \cdot a_i \quad (1)$$

Where $a_i$ are signals and $m_i$ are respective weights for determining the category of an article. The weights determine the influence or importance of each signal in determining if the article is News.

In one embodiment, a threshold score $S_t$ is used to determine when an article is News. If the score $S_1$ is above or equal to $S_t$ then the article is considered News, and if the score is below $S_t$ then the article is not-News.

The score $S_1$ may also be used to sort the articles when building the personalized stream 620 for the user. This way, personalization is improved by creating a news stream individually for a user.

In another embodiment, the signals previously calculated are also used to determine if a news article belongs in the General news category or in a topical category. The score $S_2$ for determining if an article is General News is calculated according to the following formula $$S_2 = \Sigma_{i=1 \text{ to } k} n_i \cdot b_i \quad (2)$$

Where $b_i$ are signals and $n_i$ are respective weights for determining if an article is General News. The weights determine the influence or importance of each signal in determining if the article is General News. In one embodiment, a threshold score $S_{t2}$ is used to determine when an article is News. If the score $S_2$ is above or equal to $S_{t2}$ then the article is considered general News, and if the score is below $S_{t2}$ then the article is not-News.

$S_1$ and $S_2$ may be combined to determine if an article is general news, topical news, or not news. $S_1$ and $S_2$ may also be used to sort the articles when building the personalized stream 620 for the user. This way, personalization is improved by creating a news stream individually for a user.

After calculating the scores $S_1$ and $S_2$ for the articles in the cluster, a personalized new stream 620 is created for the user. The personalized stream takes into account not only information about the articles in the cluster, but also the known interests of the user. For example, if the user has identified sports as a special interest, then the sports news will be given a higher priority and will be presented more prominently. Further, some users may enter options in a news websites to customize news. These custom options are used when creating the personalized news stream.

It is noted that the embodiments illustrated in FIG. 6 are exemplary. Other embodiments may utilize different signals, different weights for the signals, different formulas for calculating scores, etc. The embodiments illustrated in FIG. 6 should therefore not be interpreted to be exclusive or limiting, but rather exemplary or illustrative.

Figure 7:
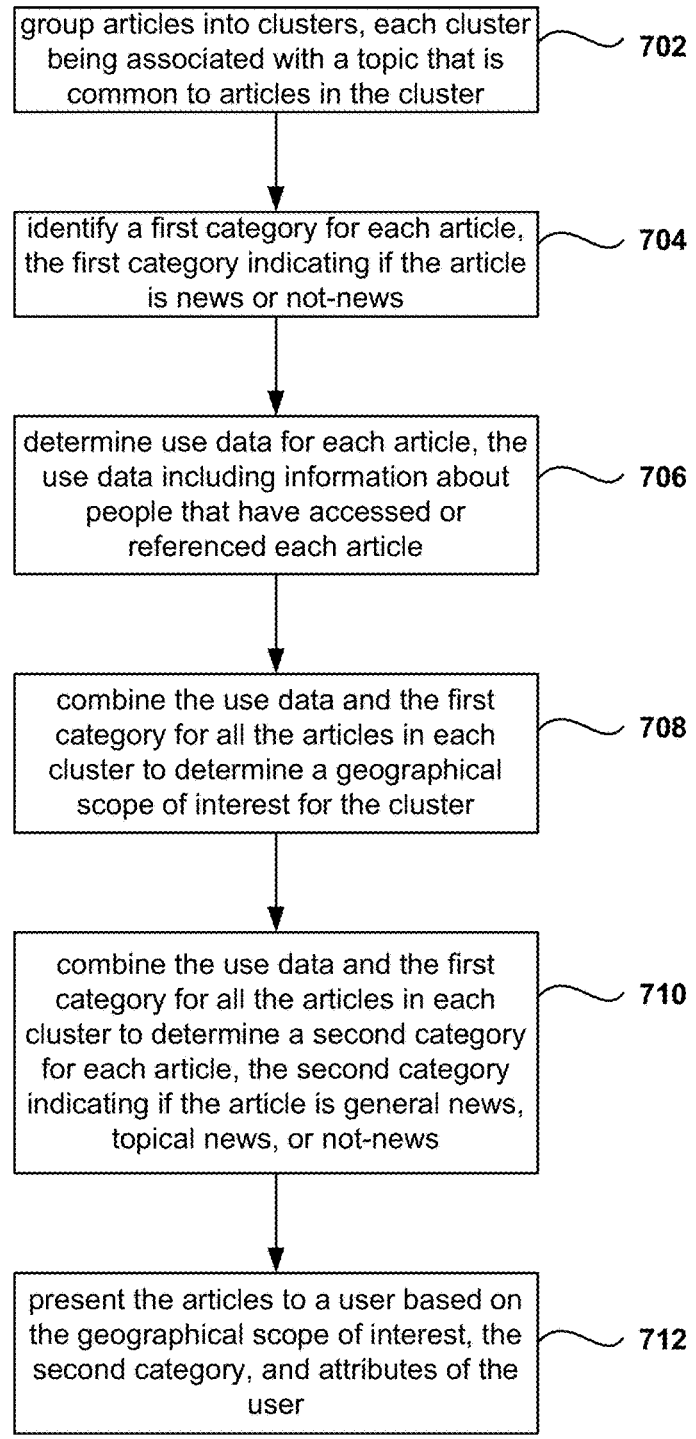
FIG. 7 is a flowchart illustrating an algorithm for categorizing news articles in accordance with one embodiment.

FIG. 7 is a flowchart illustrating an algorithm for categorizing news articles in accordance with one embodiment. While the various operations in this flowchart are presented and described sequentially, one of ordinary skill will appreciate that some or all of the operations may be executed in a different order, be combined or omitted, or be executed in parallel.

In operation 702, articles are grouped into clusters, each cluster being associated with a topic that is common to articles in the cluster. From operation 702, the method flows to operation 704 where a first category for each article is identified. The first category indicates if the article is News or not-News.

From operation 704 the method flows to operation 706, in order to determine the use data for each article. The use data includes information about people that have accessed or referenced each article. As used herein, accessing an article refers to obtaining direct knowledge of the article by a user, such as by directly reading, opening, retrieving, listening, etc., the article by the user. Further, as used herein, referring to an article by a user means any type of user activity related to the article, such as by directly accessing the article, performing searches about the article (although the article may not be actually read), social media interactions (e.g., email, social network posts, instant messages, twits, etc.). Embodiments presented herein may utilize access data, reference data, or any combination of access and reference data.

Further, from operation 706 the method flows to operation 708 to combine the use data and the first category for all the articles in each cluster to determine the geographical scope of interest for the cluster.

From operation 708 the method flows to operation 710 to combine the use data and the first category for all the articles in each cluster to determine a second category for each article. The second category indicates if the article is general news, topical news, or not-news.

Additionally, from operation 710 the method flows to operation 712, where the articles are presented to a user based on the geographical scope of interest, the second category, and the attributes of the user.

Figure 8:
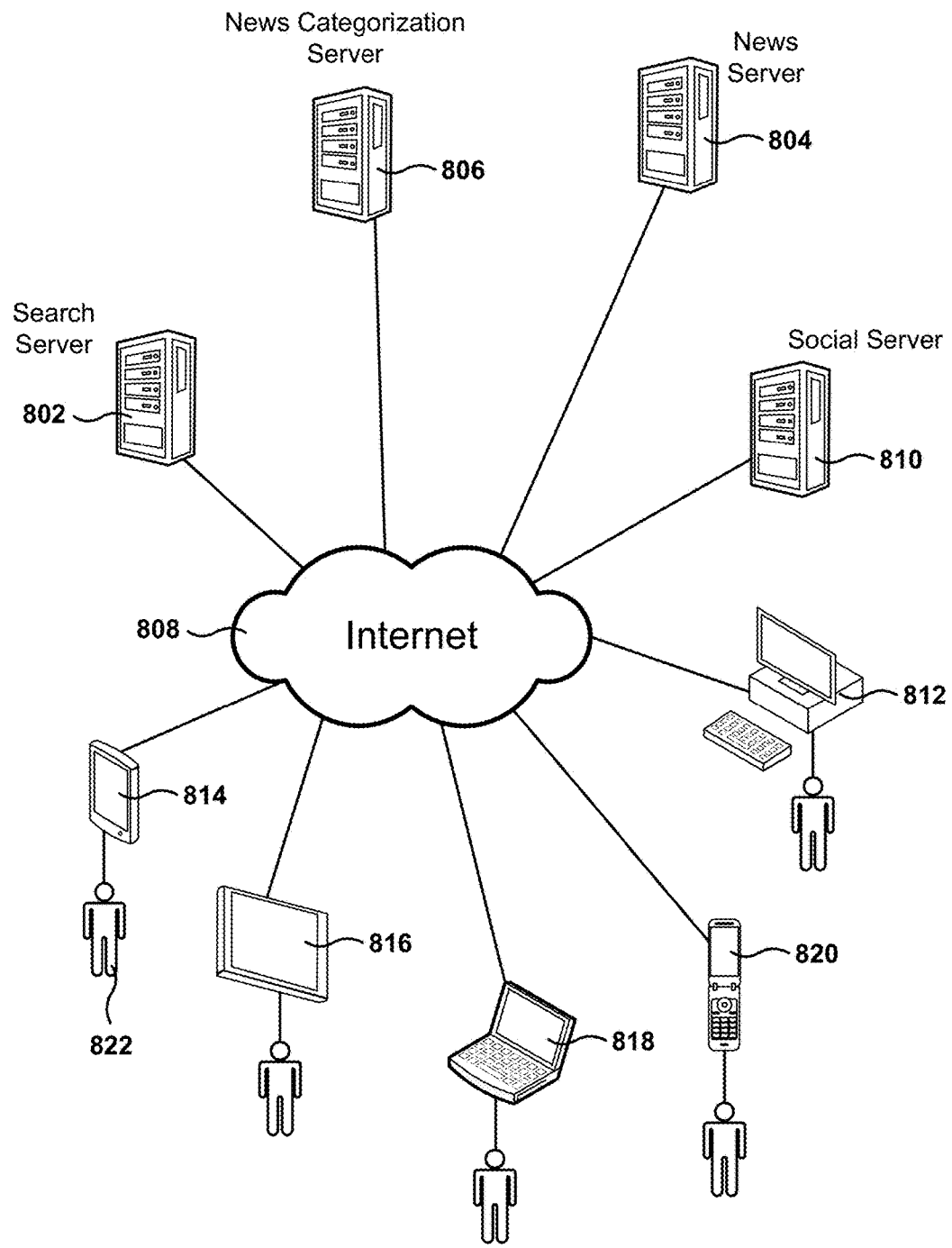
FIG. 8 is a simplified schematic diagram of a computer system for implementing embodiments of the present disclosure.

FIG. 8 is a simplified schematic diagram of a computer system for implementing embodiments of the present disclosure. Internet 808 is used to interconnect users with servers. Users 822 access Internet 808 via a variety of devices, such as smart phone 814, tablet 816, laptop 818, mobile phone 820, personal computer 812, etc. These are merely examples, and any other device used to access Internet 808 can be used to implement embodiments of this disclosure. For example, the devices may be wired or wireless. In one embodiment, a browser is executed on a device, and the graphical user interface is presented on a display. The browser provides the functionality for accessing the Internet.

Search server 802, also known as a web search engine, provides search features to Internet users. A web search engine is designed to search for information on the World Wide Web. The search results are generally presented in a list of results and are sometimes called hits. The information may consist of web pages, news pages, blogs pages, images, etc. Unlike web directories, which are maintained by human editors, search engines operate algorithmically, or use a mixture of algorithmic and human input.

News server 804 provides news to users. One example of a news server is Yahoo!® News. News may originate from a variety of sources, not just from inside the search engine website. The news search engine scouts the Internet looking for news articles, which are then made available to users. Users may access the news by selecting news articles in the website of the news search engine, searching the news by entering search terms in a search field, or selecting a news category, such as politics, sports, weather, etc.

News Categorization server 806 categorizes news articles to determine the topic and the geographic scope. News Categorization server 806 may utilize information from news server 804, search server 802, social server 810, etc. Social Server 810 provides social network services to Internet users.

Although different servers are described by way of example, the person skilled in the art will appreciate that multiple configurations are possible by combining several servers into one system, by having distributed systems where a single function can be accomplished by a plurality of different servers scattered across the Internet, or by caching information from the different databases at the different servers to accelerate the processing of information.

Figure 9:
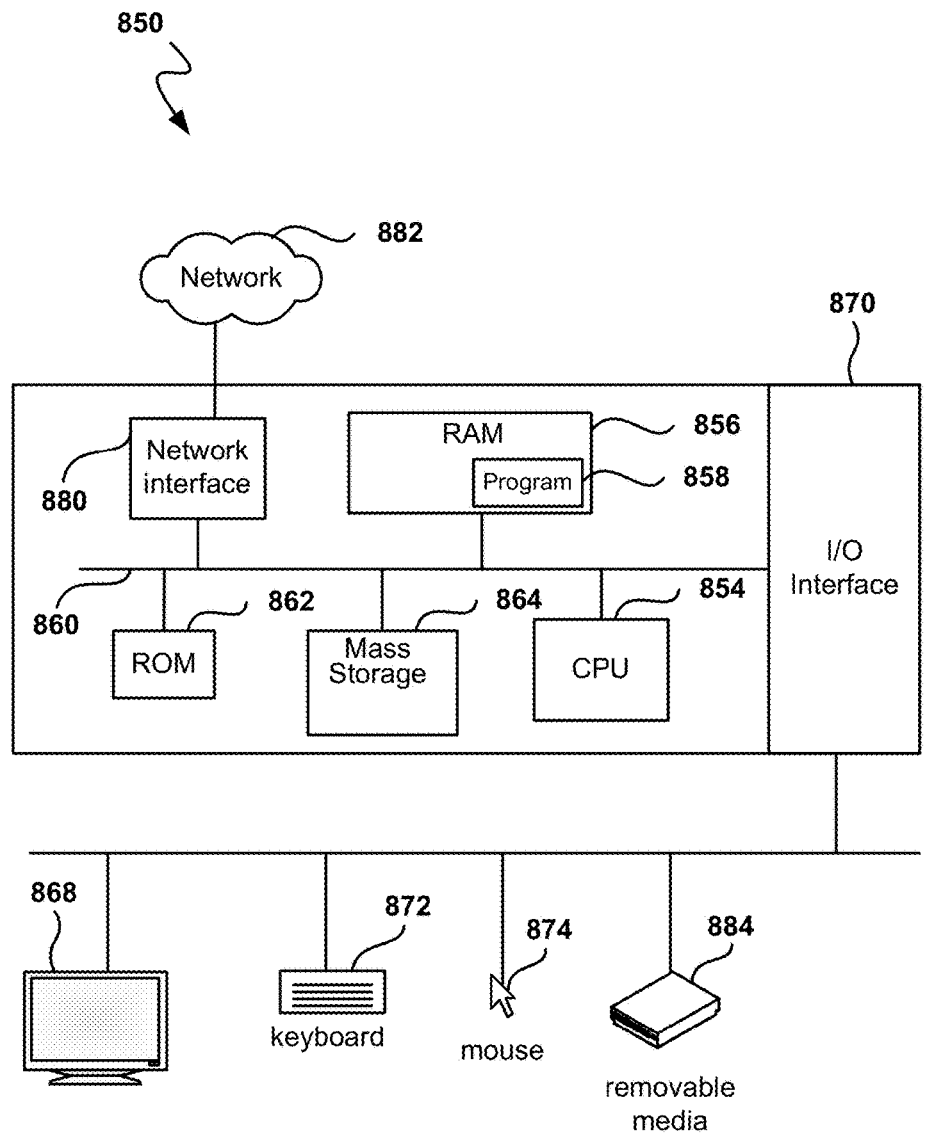
FIG. 9 is a simplified schematic diagram of a computer system for implementing embodiments of the present disclosure.

FIG. 9 is a simplified schematic diagram of a computer system for implementing embodiments of the present disclosure. It should be appreciated that the methods described herein may be performed with a digital processing system, such as a conventional, general-purpose computer system. Special purpose computers, which are designed or programmed to perform only one function, may be used in the alternative. The computer system includes a central processing unit (CPU) 1104, which is coupled through bus 1110 to random access memory (RAM) 1106, read-only memory (ROM) 1112, and mass storage device 1114. Computer program 1108 for searching relevant news articles resides in random access memory (RAM) 1106, but can also reside in mass storage 1114.

Mass storage device 1114 represents a persistent data storage device such as a floppy disc drive or a fixed disc drive, which may be local or remote. Network interface 1130 provides connections via network 1132, allowing communications with other devices. It should be appreciated that CPU 1104 may be embodied in a general-purpose processor, a special purpose processor, or a specially programmed logic device. Input/Output (I/O) interface provides communication with different peripherals and is connected with CPU 1104, RAM 1106, ROM 1112, and mass storage device 1114, through bus 1110. Sample peripherals include display 1118, keyboard 1122, cursor control 1124, removable media device 1134, etc.

Display 1118 is configured to display the user interfaces described herein. Keyboard 1122, cursor control 1124, removable media device 1134, and other peripherals are coupled to I/O interface 1120 in order to communicate information in command selections to CPU 1104. It should be appreciated that data to and from external may be communicated through I/O interface 1120. The embodiments can also be practiced in distributed computing environments where tasks are performed by remote processing devices that are linked through a wire-based or wireless network.

Table 1 below includes sample metadata found in a news article, but other embodiments may include additional metadata, different metadata, or omitted metadata.

TABLE 1

<apcm:ContentMetadata>
<apcm:DateLineLocation City="Cape Town" Country="ZAF" CountryName="South Africa" LatitudeDD="−33.925840000" LongitudeDD="18.423220000"/>
<apcm:DateLine> CAPE TOWN, South Africa
</apcm:DateLine>
<apcm:Keywords> Obama
</apcm:Keywords>
<apcm:DistributionScope> National
</apcm:DistributionScope>
<apcm:EntityClassification Authority="AP Region" Id="EURO"/>
<apcm:EntityClassification Authority="AP Region" Id="BRIT"/>
<apcm:EntityClassification Authority="AP Region" Id="SCAN"/>
<apcm:EntityClassification Authority="AP Region" Id="MEST"/>
<apcm:EntityClassification Authority="AP Region" Id="AFRI"/>
<apcm:EntityClassification Authority="AP Region" Id="INDI"/>
<apcm:EntityClassification Authority="AP Region" Id="ASIA"/>
<apcm:EntityClassification Authority="AP Region" Id="ENGL"/>
<apcm:EntityClassification Authority="AP Organization" Value="United States government" Id="898f52e08921100480efba0a2b2ca13e"/>
<apcm:EntityClassification Authority="AP Party" Value="Barack Obama" Id="b1d550d087874a0393ebfa85dab5ea0a">
  <apcm:Property Id="c9d7fa107e4e1004847adf092526b43e" Name="PartyType" Value="POLITICIAN"/>
  <apcm:Property Id="d188b8b8886b100481accb8225d5863e" Name="PartyType" Value="PERSON"/>
</apcm:EntityClassification>
<apcm:EntityClassification Authority="AP Party" Value="Nelson Mandela" Id="dd7e525268c640f786628d1fc7aec3ce">
  <apcm:Property Id="c9d7fa107e4e1004847adf092526b43e" Name="PartyType" Value="POLITICIAN"/>
  <apcm:Property Id="d188b8b8886b100481accb8225d5863e" Name="PartyType" Value="PERSON"/>
</apcm:EntityClassification>
<apcm:EntityClassification Authority="AP Party" Value="Michelle Obama" Id="9533602792124488b2fd56be0bcb43f1">
  <apcm:Property Id="2be254708ee010048bc8a55c96277d3e" Name="PartyType" Value="NEWSMAKER"/>
  <apcm:Property Id="d188b8b8886b100481accb8225d5863e" Name="PartyType" Value="PERSON"/>
</apcm:EntityClassification>
<apcm:EntityClassification Authority="AP Party" Value="Desmond Tutu" Id="556fc7651c6d4d3eafa0c30a1df6b827">
  <apcm:Property Id="2be254708ee010048bc8a55c96277d3e" Name="PartyType" Value="NEWSMAKER"/>
  <apcm:Property Id="d188b8b8886b100481accb8225d5863e" Name="PartyType" Value="PERSON"/>
</apcm:EntityClassification>
<apcm:EntityClassification Authority="AP Party" Value="George W. Bush" Id="11a7894f8b404b81b0f2f352d97eaebe">
  <apcm:Property Id="c9d7fa107e4e1004847adf092526b43e" Name="PartyType" Value="POLITICIAN"/>
  <apcm:Property Id="d188b8b8886b100481accb8225d5863e" Name="PartyType" Value="PERSON"/>

TABLE 1-continued

```
</apcm:EntityClassification>
<apcm:EntityClassification Authority="AP Geography" Value="South
Africa" Id="661ff2007d5b100482b9c076b8e3055c">
  <apcm:Property Id="01f56e0e654841eca2e69bf2cbcc0526"
    Name="LocationType" Value="Nation"/>
</apcm:EntityClassification>
<apcm:EntityClassification Authority="AP Geography" Value="United
States" Id="661e48387d5b10048291c076b8e3055c">
  <apcm:Property Id="01f56e0e654841eca2e69bf2cbcc0526"
    Name="LocationType" Value="Nation"/>
</apcm:EntityClassification>
<apcm:EntityClassification Authority="AP Geography" Value="Africa"
Id="661812607d5b100481f1c076b8e3055c">
  <apcm:Property Id="976d112cd5c3497ea180aeecab922c6b"
    Name="LocationType" Value="Continent"/>
</apcm:EntityClassification>
<apcm:EntityClassification Authority="AP Geography" Value="Cape
Town" Id="96808e787e3710048912df092526b43e">
  <apcm:Property Id="9d26a20b35f0484a891740f8189d4c7b"
    Name="LocationType" Value="City"/>
</apcm:EntityClassification>
<apcm:EntityClassification Authority="AP Geography" Value="Tanzania"
Id="661be2f07d5b1004824dc076b8e3055c">
  <apcm:Property Id="01f56e0e654841eca2e69bf2cbcc0526"
    Name="LocationType" Value="Nation"/>
</apcm:EntityClassification>
<apcm:EntityClassification Authority="AP Geography" Value="Ghana"
Id="66206b187d5b100482c1c076b8e3055c">
  <apcm:Property Id="01f56e0e654841eca2e69bf2cbcc0526"
    Name="LocationType" Value="Nation"/>
</apcm:EntityClassification>
<apcm:EntityClassification Authority="AP Geography" Value="West
Africa" Id="66188f607d5b100481fcc076b8e3055c">
  <apcm:Property Id="424cdfcd69d64fa6869055f7ebf10be4"
    Name="LocationType" Value="World region"/>
</apcm:EntityClassification>
<apcm:EntityClassification Authority="AP Geography" Value="East
Africa" Id="66188f607d5b100481f9c076b8e3055c">
  <apcm:Property Id="424cdfcd69d64fa6869055f7ebf10be4"
    Name="LocationType" Value="World region"/>
</apcm:EntityClassification>
<apcm:EntityClassification Authority="AP Geography" Value="Southern
Africa" Id="66188f607d5b100481fbc076b8e3055c">
  <apcm:Property Id="424cdfcd69d64fa6869055f7ebf10be4"
    Name="LocationType" Value="World region"/>
</apcm:EntityClassification>
<apcm:EntityClassification Authority="AP Geography" Value="North
America" Id="661850e07d5b100481f7c076b8e3055c">
  <apcm:Property Id="976d112cd5c3497ea180aeecab922c6b"
    Name="LocationType" Value="Continent"/>
</apcm:EntityClassification>
<apcm:EntityClassification Authority="AP Organization" Value="South
Africa government" Id="43833810bcdb497fa1afaefd38f6f527"/>
<apcm:SubjectClassification Authority="AP Category Code" Value="i"
Id="i"/>
<apcm:SubjectClassification Authority="AP Subject" Value="Government
and politics" Id="86aad5207dac100488ecba7fa5283c3e"/>
<apcm:SubjectClassification Authority="AP Subject" Value="African-
Americans" Id="74bbae4a3d914703acc9581f89305a62"/>
<apcm:SubjectClassification Authority="AP Subject" Value="Racial and
ethnic discrimination" Id="24af9f40872a10048cb7d7c656897a02"/>
<apcm:SubjectClassification Authority="AP Subject"
Value="Discrimination" Id="24af9f40872a10048cb6d7c656897a02"/>
<apcm:SubjectClassification Authority="AP Subject" Value="Human
rights and civil liberties" Id="008e219885ab10048110ff2260dd383e"/>
<apcm:SubjectClassification Authority="AP Subject" Value="Social
issues" Id="08680bf085af10048c4f9a5aeba5fb06"/>
<apcm:SubjectClassification Authority="AP Subject" Value="Social
affairs" Id="75a42fd87df7100483eedf092526b43e"/>
<apcm:SubjectClassification Authority="AP Subject" Value="Race and
ethnicity" Id="ec28dcdfc4ca4ac9918d3b61427e65c3"/>
<apcm:AudienceClassification Authority="AP Audience" Value="Online"
Id="9add4649b53b4702ba7d9de5d4fa607a">
  <apcm:Property Id="B6F34A252AF74F0EBCD885E6AC1057BE"
    Name="AudienceType" Value="AUDPLATFORM"/>
</apcm:AudienceClassification>
<apcm:AudienceClassification Authority="AP Audience" Value="Print"
Id="82c6a4c46fa0446090a7acaf93159e4c">
  <apcm:Property Id="B6F34A252AF74F0EBCD885E6AC1057BE"
    Name="AudienceType" Value="AUDPLATFORM"/>
```

TABLE 1-continued

```
</apcm:AudienceClassification>
<apcm:AudienceClassification Authority="AP Audience"
Value="National" Id="f43adc08760d10048040e6e7a0f4673e">
  <apcm:Property Id="317C913CF4AA4C5AB9DB610C250B8810"
    Name="AudienceType" Value="AUDSCOPE"/>
</apcm:AudienceClassification>
<apcm:AudienceClassification Authority="AP Audience"
Value="International" Id="f4ecf9b0760d10048044e6e7a0f4673e">
  <apcm:Property Id="317C913CF4AA4C5AB9DB610C250B8810"
    Name="AudienceType" Value="AUDSCOPE"/>
</apcm:AudienceClassification>
<apcm:AudienceClassification Authority="AP Audience" Value="Africa"
Id="661812607D5B100481F1C076B8E3055C">
  <apcm:Property Id="3446BF8C410D49E59C0A017D8C49F74A"
    Name="AudienceType" Value="AUDGEOGRAPHY"/>
</apcm:AudienceClassification>
<apcm:AudienceClassification Authority="AP Audience"
Value="Southern
Africa" Id="66188F607D5B100481FBC076B8E3055C">
  <apcm:Property Id="3446BF8C410D49E59C0A017D8C49F74A"
    Name="AudienceType" Value="AUDGEOGRAPHY"/>
</apcm:AudienceClassification>
<apcm:AudienceClassification Authority="AP Audience" Value="South
Africa" Id="661FF2007D5B100482B9C076B8E3055C">
  <apcm:Property Id="3446BF8C410D49E59C0A017D8C49F74A"
    Name="AudienceType" Value="AUDGEOGRAPHY"/>
</apcm:AudienceClassification>
<apcm:AudienceClassification Authority="AP Audience" Value="United
States" Id="661E48387D5B10048291C076B8E3055C">
  <apcm:Property Id="3446BF8C410D49E59C0A017D8C49F74A"
    Name="AudienceType" Value="AUDGEOGRAPHY"/>
</apcm:AudienceClassification>
<apcm:ItemContentType> Spot Development
</apcm:ItemContentType>
<apcm:Source> AP
</apcm:Source>
<apcm:Property Name="EntitlementMatch"
Id="urn:publicid:ap.org:product:32503" Value="AP Online Africa
News"/>
<apcm:Property Name="EntitlementMatch"
Id="urn:publicid:ap.org:product:41664" Value="AP Top News"/>
<apcm:Property Name="EntitlementMatch"
Id="urn:publicid:ap.org:product:42430" Value="AP Top News -
International - Stories"/>
<apcm:Property Name="EntitlementMatch"
Id="urn:publicid:ap.org:product:42433" Value="AP Top News -
Political - Stories"/>
<apcm:Property Name="EntitlementMatch"
Id="urn:publicid:ap.org:product:42437" Value="AP Top News - General
- Stories"/>
<apcm:Property Name="EntitlementMatch"
Id="urn:publicid:ap.org:package:100024" Value="AP Online"/>
<apcm:Property Name="EntitlementMatch"
Id="urn:publicid:ap.org:package:100518" Value="AP Top News
Package"/>
<apcm:Property Name="SequenceNumber" Value="OutOfSequence"
Id="0"/>
</apcm:ContentMetadata>
```

Embodiments of the present disclosure may be practiced with various computer system configurations including hand-held devices, microprocessor systems, microprocessor-based or programmable consumer electronics, minicomputers, mainframe computers and the like. The embodiments may also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for categorizing news articles, the method comprising:
    grouping articles into clusters, each cluster being associated with a topic that is common to articles in the cluster;
    identifying a plurality of signals indicative of whether an article is considered news or not-news;
    assigning a first category for each article that defines the article as news or not-news, wherein assigning the first category includes,
        obtaining a score for each article based on the plurality of signals identified from each article, and
        determining the first category as news when the score is above or equal to a predetermined threshold or not-news when the score is below the predetermined threshold;
    obtaining use data for each article, the use data including social information gathered from one or more social networks of users that have accessed or referenced each article, wherein the social information includes geographical data associated with the users that have accessed or referenced each article within the one or more social networks, and wherein the use data further includes mapped locations of users that have accessed each article;
    combining the use data and the first category for all the articles in each cluster to determine a geographical scope of interest for the cluster, wherein the geographical scope of interest for the cluster includes a geographic region in which one or more users are interested in one or more of the articles in the cluster, and wherein the geographical scope of interest for the cluster is further based on the mapped locations of users that have accessed the articles in the cluster;
    combining the use data and the first category for all the articles in each cluster to determine a second category for each article, the second category indicating if the article is general news, topical news, or not-news; and
    presenting the articles to a user based on the geographical scope of interest, the second category, and attributes of the user, wherein operations of the method are executed by a processor.

2. The method as recited in claim 1, wherein determining use data further includes:
    identifying users of a social network that have referenced each article; and
    determining a geographical location of the users that have accessed each article.

3. The method as recited in claim 1, wherein determining use data further includes:
    identifying emails that refer to each article; and
    determining a geographical location of users associated with the respective emails.

4. The method as recited in claim 1, wherein determining use data further includes:
    identifying text messages that refer to each article; and
    determining a geographical location of users associated with the respective text messages.

5. The method as recited in claim 1, wherein determining use data further includes:
    identifying users that have performed web searches related to each article; and
    determining a geographical location of users that have performed the web searches.

6. The method as recited in claim 1, wherein determining use data further includes:
    identifying news publishers that have published each article; and
    determining a geographical location of the news publishers.

7. The method as recited in claim 1, wherein determining use data further includes:
    identifying users that have performed an operation indicating an approval for each article; and
    determining a geographical location of the users.

8. The method as recited in claim 1, wherein identifying the first category further includes:
    extracting topic information from each article based on an analysis of text in each article;
    identifying categorizations given by article providers for each article; and
    utilizing machine categorization based on machine learning of sample articles categorized by judges.

9. The method as recited in claim 8, wherein utilizing machine categorization further includes:
    analyzing the sample articles to provide an automated classifier; and
    utilizing the classifier with each of the articles.

10. The method as recited in claim 1, wherein determining the second category further includes:
identifying signals associated with each article; and
combining the signals to determine the second category for each article.

11. The method as recited in claim 1, wherein the attributes of the user includes one or more of user geographical location, user residence location, user birth location, news parameters configured by the user, user social activity, or user search history.

12. The method as recited in claim 1, wherein the plurality of signals are selected from a group consisting of social network activity of a user accessing the article, or geographic location of a user accessing the article, or geographic locations of users utilizing search engines to find the article, or geographic location of news publisher that published the article.

13. A computer program embedded in a non-transitory computer-readable storage medium, when executed by one or more processors, for categorizing news articles, the computer program comprising:
program instructions for grouping articles into clusters, each cluster being associated with a topic that is common to articles in the cluster;
program instructions for identifying a plurality of signals indicative of whether an article is considered news or not-news;
program instructions for assigning a first category for each article that defines the article as news or not-news, wherein assigning the first category includes,
obtaining a score for each article based on the plurality of signals identified from each article, and
determining the first category as news when the score is above or equal to a predetermined threshold or not-news when the score is below the predetermined threshold;
program instructions for obtaining use data for each article, the use data including social information gathered from one or more social networks of users that have accessed or referenced each article, wherein the social information includes geographical data associated with the users that have accessed or referenced each article within the one or more social networks, and wherein the use data further includes mapped locations of users that have accessed each article;
program instructions for combining the use data and the first category for all the articles in each cluster to determine a geographical scope of interest for the cluster, wherein the geographical scope of interest for the cluster includes a geographic region in which one or more users are interested in one or more of the articles in the cluster, and wherein the geographical scope of interest for the cluster is further based on the mapped locations of users that have accessed the articles in the cluster;
program instructions for combining the use data and the first category for all the articles in each cluster to determine a second category for each article, the second category indicating if the article is general news, topical news, or not-news; and
program instructions for presenting the articles to a user based on the geographical scope of interest, the second category, and attributes of the user.

14. The computer program as recited in claim 13, wherein determining use data further includes:
identifying instant messages that refer to each article; and
determining a geographical location of users associated with the respective instant messages.

15. The computer program as recited in claim 13, wherein determining use data further includes:
identifying emails that refer to each article; and
determining a geographical location of users associated with the respective emails.

16. The computer program as recited in claim 13, wherein determining use data further includes:
identifying users that have performed web searches related to each article; and
determining a geographical location of users that have performed the web searches.

17. The computer program as recited in claim 13, wherein determining use data further includes:
identifying news publishers that have published each article; and
determining a geographical location of the news publishers.

18. The computer program as recited in claim 13, wherein determining use data further includes:
identifying users that have performed an operation indicating an approval for each article; and
determining a geographical location of the users.

19. A system for categorizing news articles, the system comprising:
a processor; and
a memory having a computer program, wherein program instructions from the computer program when executed by the processor cause the processor to:
group articles into clusters, each cluster being associated with a topic that is common to articles in the cluster;
identify a plurality of signals indicative of whether an article is considered news or not-news;
assign a first category for each article, the first category defining the article as news or not-news, wherein assigning the first category includes,
obtaining a score for each article based on the plurality of signals identified from each article, and
determining the first category as news when the score is above or equal to a predetermined threshold or not-news when the score is below the predetermined threshold;
obtain use data for each article, the use data including social information gathered from one or more social networks of users that have accessed or referenced each article, wherein the social information includes geographical data associated with the users that have accessed or referenced each article within the one or more social networks, and wherein the use data further includes mapped locations of users that have accessed each article;
combine the use data and the first category for all the articles in each cluster to determine a geographical scope of interest for the cluster, wherein the geographical scope of interest for the cluster includes a geographic region in which one or more users are interested in one or more of the articles in the cluster, and wherein the geographical scope of interest for the cluster is further based on the mapped locations of users that have accessed the articles in the cluster;
combine the use data and the first category for all the articles in each cluster to determine a second category for each article, the second category indicating if the article is general news, topical news, or not-news; and present the articles to a user based on the geographical scope of interest, the second category, and attributes of the user.

20. The system of claim 19, wherein determining the use data further includes:

identifying one of an endorsement, a like, a thumbs-up, a recommendation, or a tweet of the users that have accessed or referenced each article; and determining a geographical location of the users that have accessed or referenced each article.

* * * * *